United States Patent
Yarger et al.

(10) Patent No.: US 9,160,834 B2
(45) Date of Patent: Oct. 13, 2015

(54) CASE WITH EMBEDDED ELECTRONICS TO PROVIDE INTERFACE BETWEEN GLUCOSE SENSOR AND SMARTPHONE

(71) Applicant: Becton, Dickinson and Company, Franklin Lakes, NJ (US)

(72) Inventors: Michael Yarger, Chapel Hill, NC (US); Nathaniel McCaffrey, Mill Valley, CA (US); Aaron Weber, Arlington, MA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 35 days.

(21) Appl. No.: 14/050,198

(22) Filed: Oct. 9, 2013

(65) Prior Publication Data
US 2014/0106676 A1    Apr. 17, 2014

Related U.S. Application Data

(60) Provisional application No. 61/713,152, filed on Oct. 12, 2012.

(51) Int. Cl.
| | |
|---|---|
| H04B 7/00 | (2006.01) |
| H04M 1/725 | (2006.01) |
| H04B 1/3883 | (2015.01) |
| H04W 88/02 | (2009.01) |
| H04M 1/04 | (2006.01) |

(52) U.S. Cl.
CPC ......... *H04M 1/72527* (2013.01); *H04B 1/3883* (2013.01); *H04W 88/02* (2013.01); *H04M 1/04* (2013.01)

(58) Field of Classification Search
USPC ................ 455/41.2, 39, 41.3, 500, 517, 66.1, 455/67.11, 557, 575.6, 575.8; 340/539.24, 340/539.26; 604/503, 504; 600/345, 347
See application file for complete search history.

(56) References Cited

U.S. PATENT DOCUMENTS

| | | | |
|---|---|---|---|
| 7,344,500 B2 | 3/2008 | Talbot et al. | |
| 7,496,392 B2 | 2/2009 | Alarcon et al. | |
| 7,969,307 B2 | 6/2011 | Peeters | |
| 8,145,431 B2 | 3/2012 | Kloepfer et al. | |
| 8,639,288 B1 | 1/2014 | Friedman | |
| 2005/0019848 A1* | 1/2005 | Lee et al. | 435/14 |
| 2005/0277872 A1* | 12/2005 | Colby et al. | 604/67 |
| 2007/0030339 A1* | 2/2007 | Findlay et al. | 348/14.01 |
| 2007/0135790 A1* | 6/2007 | Auerbach | 604/500 |
| 2007/0170073 A1* | 7/2007 | Wang et al. | 205/775 |
| 2008/0060955 A1 | 3/2008 | Goodnow | |
| 2009/0058643 A1* | 3/2009 | Groth | 340/568.1 |

(Continued)

OTHER PUBLICATIONS

Finders beepers: Review of the Cobra Tag, StickNFind, and BiKN Smart Case, Consumer Report, Dec. 2013, http://www.consumer-reports.org/cro/2013/12/cobra-tag-sticknfind-bikn-smart-case-review/index.htm, Accessed Feb. 10, 2014.

(Continued)

*Primary Examiner* — Sonny Trinh
(74) *Attorney, Agent, or Firm* — Dickinson Wright PLLC

(57) ABSTRACT

A mobile phone case with an embedded wireless interface for enabling communications between a continuous glucose monitoring (CGM) sensor and a mobile phone is described. The mobile phone case includes an autonomous battery and an autonomous alarm speaker for enabling communication with a CGM sensor in situations where the mobile phone is unavailable.

16 Claims, 3 Drawing Sheets

(56) References Cited

U.S. PATENT DOCUMENTS

| | | | |
|---|---|---|---|
| 2011/0119080 A1 | 5/2011 | Hayter et al. | |
| 2013/0069499 A1* | 3/2013 | Modrell | 312/223.1 |
| 2014/0074059 A1* | 3/2014 | Howell et al. | 604/503 |
| 2014/0148665 A1* | 5/2014 | Bernstein | 600/345 |
| 2014/0257058 A1* | 9/2014 | Clarysse et al. | 600/301 |

OTHER PUBLICATIONS

Canopy's touch-sensitive iPhone case gets more sensitive, Katharine Grayson, Jan. 6, 2014, http://www.bizjournals.com/twincities/blog/in_private/2014/01/canopys-touch-sensitive-iphone-case.html, Accessed Feb. 10, 2014.

Smartphone Stun Gun Case by Yellow Jacket, Matthew Breen in Tech, http://pursuitist.com/smartphone-stun-gun-case-yellow-jacket/, Accessed Feb. 10, 2014.

Three Big Ideas for Post-Smartphone Design, From the Mind Behind Beats by Dre, Kyle Vanhemert, Wired, Jan. 6, 2014, http://www.wired.com/design/2014/01/3-big-ideas-for-post-smartphone-design-from-the-mind-behind-the-nook-the-newton-and-beats-by-dre/, Accessed Feb. 10, 2014.

Solar powered case with battery for smartphones by Enerplex, Tendai Mupaso, Jan. 18, 2014, http://www.techzim.co.zw/2014/01/emerging-market-relevant-gadgets-ces-2014/, Accessed Feb. 10, 2014.

* cited by examiner

CASE WITH EMBEDDED ELECTRONICS TO PROVIDE INTERFACE BETWEEN GLUCOSE SENSOR AND SMARTPHONE

This application claims the benefit under 35 U.S.C. §119 (e) of U.S. provisional application No. 61/713,152, filed Oct. 12, 2012, the entire contents of which are hereby incorporated by reference.

BACKGROUND OF THE INVENTION

1. Field of the Invention

The present invention relates generally to a mobile phone case with an embedded wireless interface for enabling communications between a continuous glucose monitoring (CGM) sensor and a mobile phone. More specifically, the present invention provides a mobile phone case including autonomous battery power and an autonomous alarm speaker for enabling communication with a CGM sensor in situations where a mobile phone is unavailable.

2. Description of the Related Art

Diabetes is a group of diseases marked by high levels of blood glucose resulting from defects in insulin production, insulin action, or both. Diabetes can lead to serious complications and premature death, but there are well-known products available for patients with diabetes to help control the disease and lower the risk of complications.

Treatment options for diabetics include specialized diets, oral medications and/or insulin therapy. The primary goal for diabetes treatment is to control a diabetic's blood glucose (sugar) level in order to increase the chances of a complication-free life. Because of the nature of diabetes and its short-term and long-term complications, it is important that diabetics have a constant awareness of the level of glucose in their blood.

There are typically two methods for measuring a user's blood glucose level. One method uses an electronic blood glucose meter. A sample of blood is obtained by piercing the skin of a user with a lancet. The sample of blood is then placed on a chemically-active test-strip, which interfaces with the blood glucose meter. Within several seconds of inserting the test-strip into the blood glucose meter, the blood glucose level of the user is read and shown on the digital display of the blood glucose meter.

The blood glucose meter method provides an accurate snapshot of a user's blood glucose level at a single moment in time. However, the blood glucose meter method does not indicate whether the user's glucose level is rising, falling, or steady. Additionally, the blood glucose meter method fails to capture a user's changing blood sugar levels after meals, between meals, and during the night.

An alternative method for measuring a user's blood glucose level in a continuous or real-time basis is to use a continuous glucose monitor (CGM) system. A CGM system generally includes a sensor, a transmitter, and a handheld receiver.

A typical glucose oxidase sensor is a small, thin metallic filament that is inserted just below the skin using a mechanical insertion device. The glucose oxidase sensor rests in the fatty layer below the skin, so it is generally not felt by the user wearing it. An adhesive patch or tape covering keeps the sensor securely in place. The glucose oxidase sensor contains a chemical that reacts with the glucose in the interstitial fluid, that is, fluid between the fat cells below the skin surface, causing a small electric current. Of course, embodiments of the present invention may be used with any type of sensor including a wide variety of known glucose sensors.

After the glucose oxidase sensor is inserted, a radio transmitter receives the tiny electric current from the glucose oxidase sensor and sends out a short-range radio signal. The signal from the transmitter is received by a battery-powered handheld device that displays the glucose measurement. Preferably, the receiver analyzes and displays historical data including but not limited to trend graphs, up/down arrows, and various statistics.

The handheld receiver can be customized to alert the user of glucose values that exceed certain high or low levels. This is important to those with hypoglycemia who could otherwise be unaware to potentially dangerous low blood glucose. Likewise, the high alert allows the user to act in a timely manner in order to avoid prolonged bouts of hyperglycemia and extreme high values. The alerts enable more aggressive management of after-meal blood glucose levels, and serve as an effective early warning system to prevent ketoacidosis. Certain receiver devices also provide predictive alerts based on the present glucose value and the current rate of change.

Because of the ubiquity of mobile phones, there is considerable interest in integrating mobile phones as a replacement to the handheld receivers in a CGM system. Replacing a handheld receiver with a mobile phone would provide greater convenience to a user by reducing the amount of devices that the user would have to carry on their person. Moreover, a mobile phone would provide a convenient touchscreen interface, and enable a user to easily update the software.

There are, however, several issues that could potentially arise from using a mobile phone as a replacement to a CGM system receiver. First, due to the high usage of mobile phones, their batteries must be charged frequently, thus presenting a high probability that the batteries could die and the mobile phone be unavailable to communicate with a CGM sensor at some point. Second, unlike a CGM system handheld receiver, the mobile phone may be loaded with additional software including some that could cause the mobile phone to malfunction either by accident or possibly even a virus. Finally, the wireless interfaces currently available on mobile phones tend to be high power/high data rate interfaces such as Bluetooth, and therefore, not ideally suited for use with a CGM system sensor where battery-life and battery-size are important factors.

Accordingly, there is a need for a mobile phone case including a wireless interface for enabling communications between a CGM sensor and a mobile phone. Additionally, there is a need for a mobile phone case that provides autonomous battery power, autonomous communication with the GGM sensor, and an autonomous alarm speaker, for enabling communication with a CGM sensor in situations where the mobile phone battery is dead, the mobile phone is not functioning, or is otherwise unavailable.

Moreover, there is a need for a mobile phone case including a pass-through connector for simultaneously recharging an autonomous battery embedded in the mobile phone case while the mobile phone is being charged, which also provides a wired interface for communicating with the mobile phone.

SUMMARY OF THE INVENTION

Exemplary embodiments of the present invention address some or all of the above problems and/or disadvantages and provide at least the advantages described below.

Accordingly, an aspect of an exemplary embodiment of the present invention is to provide a mobile phone case with embedded electronics providing an interface between a glucose sensor and a mobile phone, the mobile phone case comprising an embedded controller including a first wireless interface for communicating with the glucose sensor, and a second wireless interface for communicating with the mobile phone.

Another aspect of an exemplary embodiment of the present invention comprises an embedded battery that provides autonomous power to the embedded electronics in the mobile phone case.

Another aspect of an exemplary embodiment of the present invention comprises an embedded speaker that generates audible alerts when the mobile phone is unavailable.

Another aspect of an exemplary embodiment of the present invention comprises a pass-through connector for simultaneously recharging the autonomous battery embedded in the mobile phone case while the mobile phone is being charged.

Another aspect of an exemplary embodiment of the present invention comprises an embedded controller wherein a first wireless interface is a low-powered wireless interface and a second wireless interface is a high-powered wireless interface.

Another aspect of an exemplary embodiment of the present invention comprises a mobile phone case including an embedded non-volatile memory for storage of user data.

An additional aspect of an exemplary embodiment of the present invention is to provide a mobile phone case with embedded electronics providing an interface between a glucose sensor and a mobile phone, the mobile phone case comprising an embedded controller including a wireless interface for communicating with the glucose sensor, and a wired interface for communicating with the mobile phone via a pass-through connector of the mobile phone case that is directly connected to a docking port of the mobile phone.

An additional aspect of an exemplary embodiment of the present invention is to provide a method comprising a mobile phone case that interfaces communication between a glucose sensor and a mobile phone, the method comprising the steps of receiving, at an embedded controller of the mobile phone case, a wireless signal comprising data from a glucose sensor, determining, by the controller, whether a mobile phone is available, transmitting the data received from the glucose sensor to the mobile phone if the mobile phone is available, displaying the data from the glucose sensor on a display of the mobile phone, transmitting the data received from the glucose sensor to an embedded speaker of the mobile phone case if the mobile phone is not available, and sounding an alert based on the data received from the glucose sensor.

Another aspect of an exemplary embodiment of the present invention comprises a method wherein the data received from the glucose sensor is transmitted wirelessly from the controller to the mobile phone.

Another aspect of an exemplary embodiment of the present invention comprises a method wherein the data received from the glucose sensor is transmitted from the controller to the mobile phone via a pass-through connector of the mobile phone case that is directly connected to a docking port of the mobile phone.

Another aspect of an exemplary embodiment of the present invention comprises a method wherein if the controller determines that the mobile phone is not available, the controller will store a user's data in a non-volatile memory for retrieval when the mobile phone is once again available.

BRIEF DESCRIPTION OF THE DRAWINGS

The various objects, advantages and novel features of the exemplary embodiments of the present invention will be more readily appreciated from the following detailed description when read in conjunction with the appended drawings, in which.

Throughout the drawing figures, like reference numbers will be understood to refer to like elements, features and structures.

DETAILED DESCRIPTION OF THE EXEMPLARY EMBODIMENTS

Embodiments of the present invention relate to a mobile phone case with embedded electronics that provide an interface between a glucose sensor and the mobile phone. An object of embodiments of the present invention is to provide a mobile phone case with an embedded wireless interface for enabling communications between a continuous glucose monitoring (CGM) sensor and a mobile phone. Another object of the present invention is to provide a mobile phone case including autonomous battery power, communication interface, and an autonomous alarm speaker for enabling communication with a CGM sensor in situations where the mobile phone is dead, not functioning, or otherwise unavailable.

Figure 1:
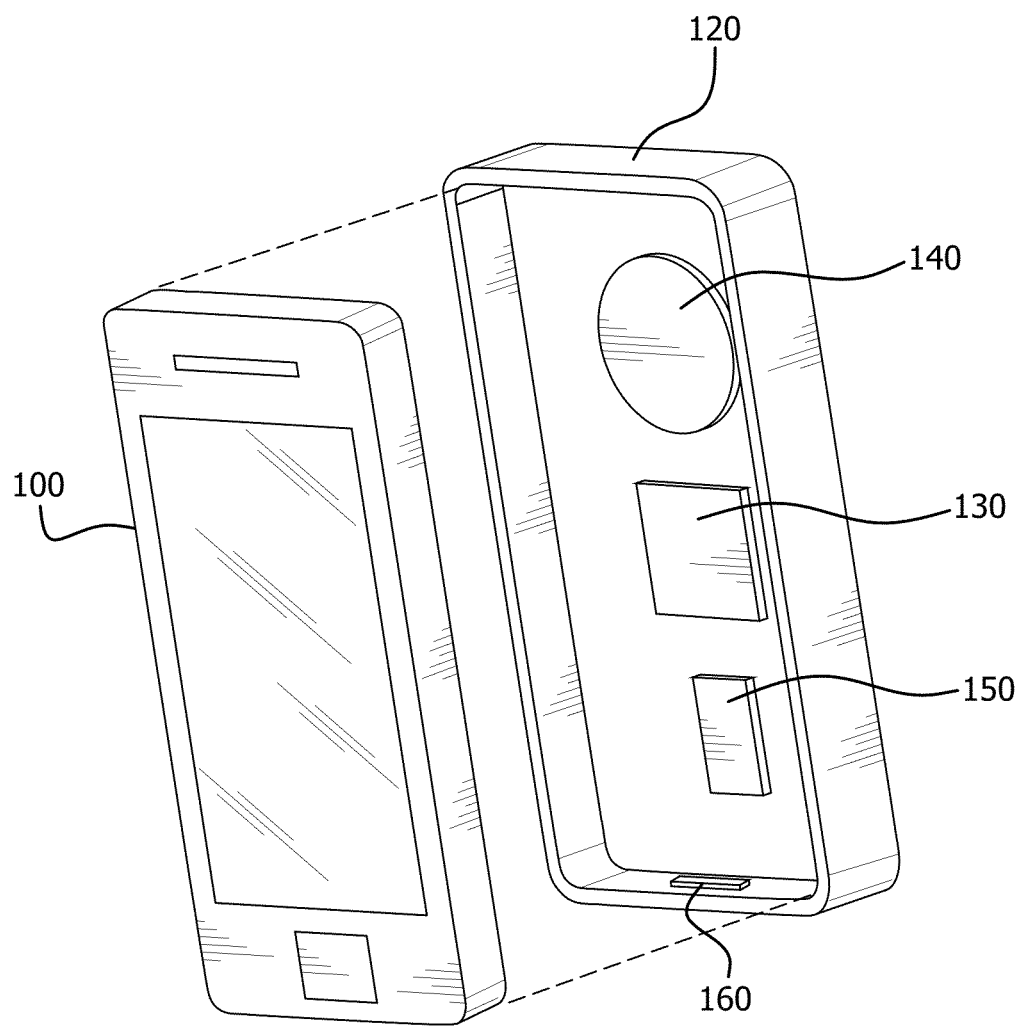
FIG. 1 depicts an illustrative embodiment of a mobile phone case with embedded electronics that provide an interface between a glucose sensor and the mobile phone of the present invention.
Figure 1:
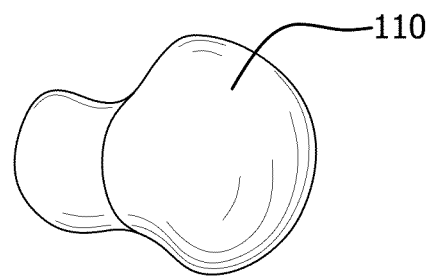

An illustrative embodiment of a case with embedded electronics that provide an interface between a mobile phone 100 and a CGM sensor 110 of the present invention is shown in FIG. 1. Referring to FIG. 1, an illustrative embodiment of a mobile phone case 120 of the present invention includes a circuit board controller 130, speaker 140, a battery 150, and a pass-through connector 160.

The embedded circuit board controller 130 of the mobile phone case 120 preferably includes two wireless interfaces that serve as a bridge between the CGM sensor 110 and the mobile phone 100. A first wireless interface serves as a bridge between the mobile phone 100 and the mobile phone case 120. A second wireless interface serves as a bridge between the mobile phone case 120 and the CGM sensor 110. The embedded circuit board controller 130 also preferably includes a non-volatile memory for storage of data related to a user's glucose level received from the CGM sensor 110.

The first wireless interface is preferably an ultra-low power interface for communicating with the CGM sensor 110. Some examples of the ultra-low power interface include ZigBee, Bluetooth low energy (BLE), or other custom interfaces. Preferably, the range for the ultra-low power interface can be up to approximately 10 meters. The second wireless interface would be a more traditional high-powered wireless interface such as Bluetooth or Wi-Fi that can communicate with the mobile phone. Alternately, of course, wired communication between the case 120 and the mobile phone 100 may be made by means of the pass through connector 160.

The embedded speaker 140 of the mobile phone case 120 is provided to generate various sounds and tones in response to alert signals received from the CGM sensor 110. Preferably, the speaker 140 is an ultra-thin piezoelectric speaker device that generates sound by the flexure vibration of a thin piezo ceramic plate. Piezoelectric speakers help expand the battery 150 life as they generally consume less electrical power than dynamic speakers. The embedded speaker 140, however, is not limited to a piezoelectric speaker, and may be any suitable audio device capable of being embedded in the mobile phone case 120.

The embedded battery 150 provides power to the electrical components of the mobile phone case 120. Moreover, if the mobile phone 100 battery dies or the mobile phone 100 is otherwise not functioning properly, the mobile phone case 120 has its own power to continue communicating with the CGM sensor 110 and the speaker 140 can used to indicate critical alarms to the user. The battery may be any flat battery capable of being embedded in the mobile phone case 120, such as a lithium polymer battery.

The pass-through connector 160 of the mobile phone case 120 connects the mobile phone's native charger cable on the outside of the case to the mobile phone's dock connector port. The pass-through connector 160 is used to simultaneously recharge the battery 150 in the mobile phone case 120 while the mobile phone 100 is being charged. In alternate embodiments of the present invention, the pass-through connector 160 may also serve as a direct connection to communicate with the mobile phone 100 as an alternative to the second wireless interface described above.

Figure 2:
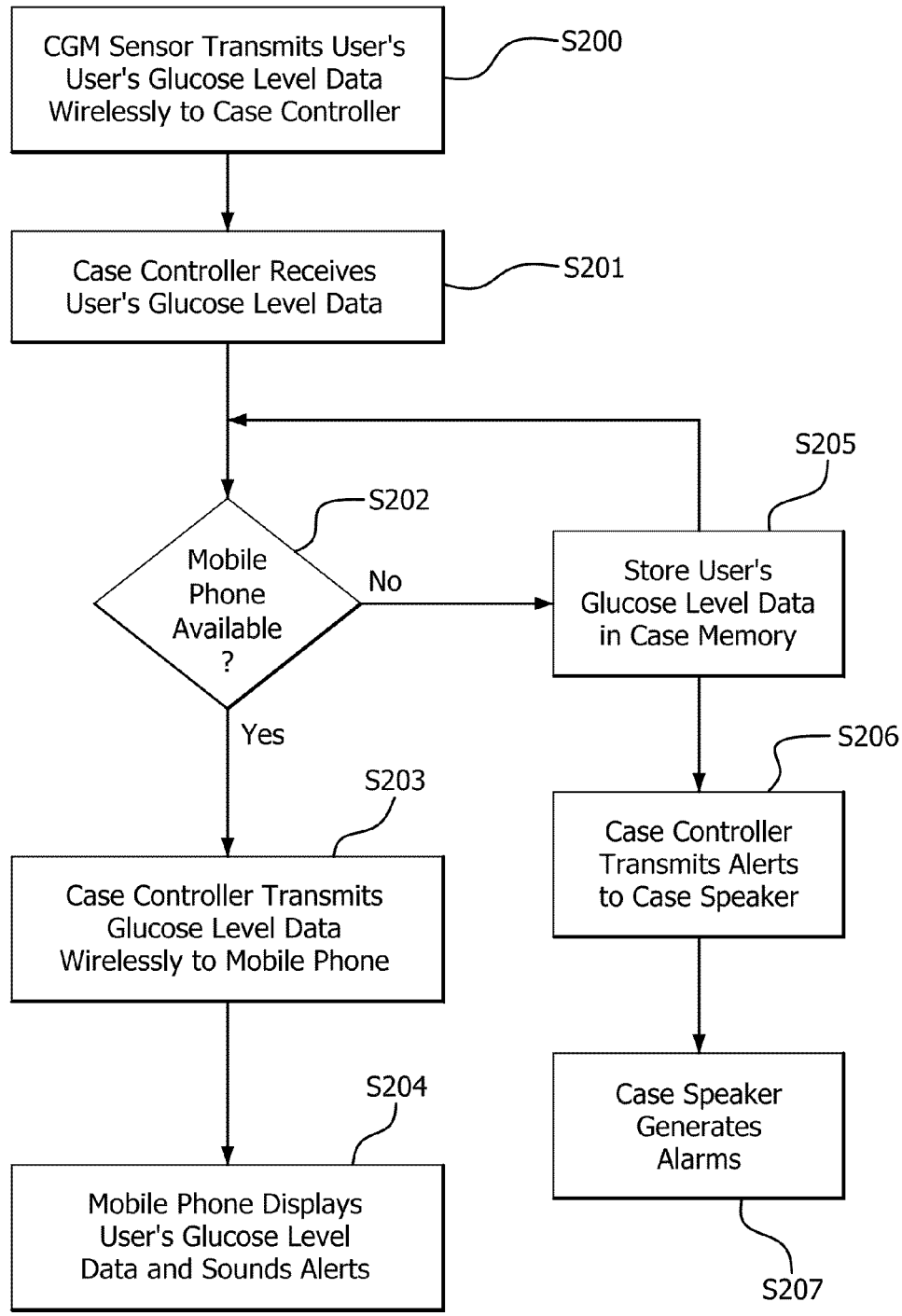
FIG. 2 depicts a flowchart illustrating the operation of an embodiment of the mobile phone case of the present invention.

An illustrative embodiment of the operation of the mobile phone case 120 will be discussed with reference to FIG. 2.

The CGM sensor 110 is inserted just below the skin of a user and secured in the fatty layer below the skin of the user. The CGM sensor 110 of illustrative embodiments of the present invention is preferably a glucose binding protein sensor, as described in U.S. Pat. No. 7,787,923, the entire contents of which are incorporated herein by reference. Embodiments of the present invention, however, may be used with any type of sensor including a wide variety of known glucose sensors. The sensor 110 contains a chemical that reacts with the glucose in the interstitial fluid, triggering an electric current. A radio transmitter may be integrated with or attached separately to the sensor 110 and receives the electric current from the sensor 110.

In step S200, the transmitter of the sensor 110 intermittently transmits an ultra-low powered, short-range radio signal with a user's glucose level data to a first wireless interface of the controller 130, which is embedded in the mobile phone case 120, to establish a first wireless connection.

The first wireless interface of controller 130 receives the ultra-low powered signal comprising the user's glucose level from the transmitter of the sensor 110 in step S201.

In step S202, the controller 130 determines whether the associated mobile phone 100 is operational and available for use. In embodiments of the present invention, the availability of the mobile phone 100 is determined in one of two ways. The controller 130 of the mobile phone case 120 intermittently attempts to establish a radio link connection with the mobile phone 100. If no response to the radio link attempt is received from the mobile phone 100, then the controller 130 determines that the mobile phone 100 is unavailable. Alternatively, the controller 130 can directly monitor the battery voltage of the mobile phone 100 via the pass-through connector 160. If the battery voltage level of the mobile phone 100 is dead or below a predetermined threshold, then the controller will determine that the mobile phone 100 is unavailable.

If the controller 130 determines that the associated mobile phone 100 is operational and available for use, a second wireless interface of the controller 130 transmits the user's glucose level data to the mobile phone 100 via a Bluetooth or WiFi signal to establish a second wireless connection, as shown in step S203.

In step S204, the mobile phone 100 displays the user's measured glucose levels via a mobile application software. The mobile application software can display trend graphs, up/down arrows, and other various statistics. The mobile application software can also be customized to alert the user of glucose values that exceed certain high or low levels. This is important to those with hypoglycemia who could otherwise be unaware to potentially dangerous low blood glucose. Likewise, the high alert allows the user to act in a timely manner in order to avoid prolonged bouts of hyperglycemia and extreme high values. The mobile application software can also provide predictive alerts based on the present glucose value and the current rate of change.

However, if the controller 130 determines that the associated mobile phone 100 is not available in step S202, due to a dead battery, a virus, or other malfunction, the controller 130 will store the user's glucose level data in the non-volatile memory embedded in the mobile phone case 120, as shown in step S205. The user's glucose level data is stored in the memory for retrieval when the mobile phone 100 is once again available.

After storing the user's glucose level data, the controller 130 will then transmit an alert to the speaker 140 embedded in the mobile phone case 120, as shown in step S206. In step S207, the speaker 140 generates an audible alert when it receives an alert from the controller 130. Due to the autonomous battery embedded in the mobile phone case 120, the case 120 has its own power to continue to communicate with the CGM sensor 110 and power the speaker 140 to indicate critical alarms to the user in situations where the mobile phone 100 is unavailable.

Figure 3:
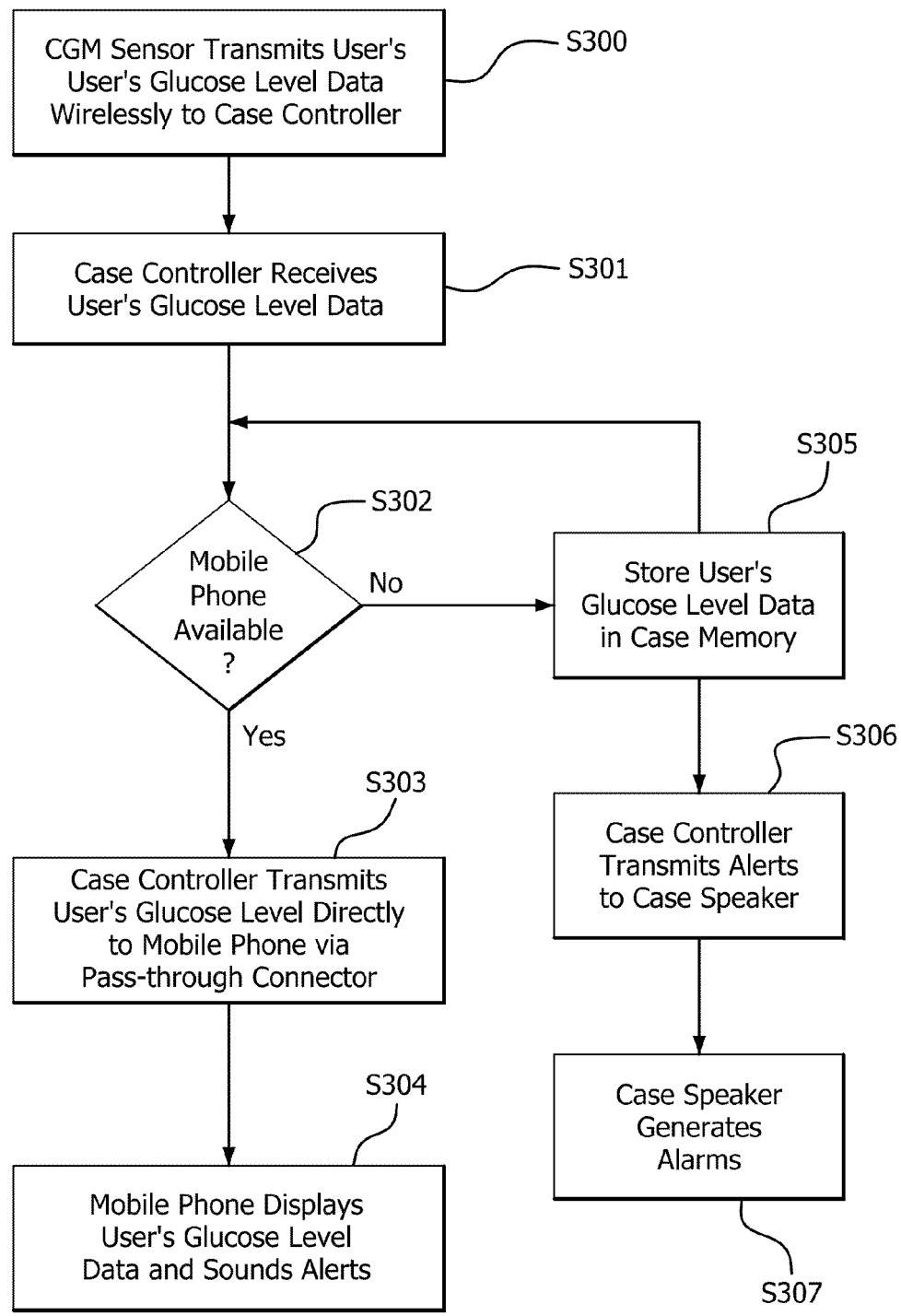
FIG. 3 depicts a flowchart illustrating the operation of another embodiment of the mobile phone case of the present invention.

Another illustrative embodiment of the operation of the mobile phone case 120 will be discussed with reference to FIG. 3.

In step S300, the transmitter of the sensor 110 intermittently transmits an ultra-low powered, short-range radio signal with a user's glucose level data to a first wireless interface of the controller 130, which is embedded in the mobile phone case 120, to establish a first wireless connection.

The first wireless interface of controller 130 receives the ultra-low powered signal comprising the user's glucose level from the transmitter of the sensor 110 in step S301.

In step S302, the controller 130 determines whether the associated mobile phone 100 is operation and available for use.

If the controller 130 determines that the associated mobile phone 100 is operational and available for use, the controller 130 directly transmits the user's glucose level data to the mobile phone 100 via the pass-through connector 160, as shown in step S303. In this illustrative embodiment of the present invention, the pass-through connector serves the dual purpose of channeling the charging of the battery 150 and providing a direct communication path between the controller 130 of the mobile phone case 120 and the docking port of the mobile phone 100.

In step S304, the mobile phone 100 displays the user's measured glucose levels. The mobile phone 100 can display trend graphs, up/down arrows, and other various statistics. The mobile phone 100 can also be customized to alert the user of glucose values that exceed certain high or low levels. This is important to those with hypoglycemia who could otherwise be unaware to potentially dangerous low blood glucose. Likewise, the high alert allows the user to act in a timely manner in order to avoid prolonged bouts of hyperglycemia and extreme high values. The mobile phone 100 can also provide predictive alerts based on the present glucose value and the current rate of change.

However, if the controller 130 determines that the associated mobile phone 100 is not available in step S302, due to a dead battery, a virus, or other malfunction, the controller 130 will store the user's glucose level data in the non-volatile memory embedded in the mobile phone case 120, as shown in step S305. The user's glucose level data is stored in the memory for retrieval when the mobile phone 100 is once again available.

After storing the user's glucose level data, the controller 130 will then transmit an alert to the speaker 140 embedded in the mobile phone case 120, as shown in step S306. In step S307, the speaker 140 generates an audible alert when it receives an alert from the controller 130. Due to the autonomous battery embedded in the mobile phone case 120, the case 120 has its own power to continue to communicate with the CGM sensor 110 and power the speaker 140 to indicate critical alarms to the user in situations where the mobile phone 100 is unavailable.

While certain exemplary embodiments of the present invention have been shown and described herein with reference to certain preferred embodiments thereof, it will be understood by those skilled in the art that various changes in form and details may be made therein without departing from the spirit and scope of the invention.

What is claimed is:

1. A mobile phone case with embedded electronics providing an interface between a glucose sensor and a mobile phone, the mobile phone case comprising:
    an embedded controller including:
    a first wireless interface for communicating with the glucose sensor; and
    a second wireless interface for communicating with the mobile phone.

2. The mobile phone case of claim 1, further comprising an embedded battery that provides autonomous power to the embedded electronics embedded in the mobile phone case.

3. The mobile phone case of claim 1, further comprising an embedded speaker that generates audible alerts when the mobile phone is unavailable.

4. The mobile phone case of claim 2, further comprising a pass-through connector for simultaneously recharging the autonomous battery embedded in the mobile phone case while the mobile phone is being charged.

5. The mobile phone case of claim 1, wherein the first wireless interface is an ultra low-powered wireless interface and the second wireless interface is a high-powered wireless interface.

6. The mobile phone case of claim 1, wherein the embedded controller includes a non-volatile memory for storage of user data.

7. A mobile phone case with embedded electronics providing an interface between a glucose sensor and a mobile phone, the mobile phone case comprising:
    an embedded controller including:
    a wireless interface for communicating with the glucose sensor; and
    a wired interface for communicating with the mobile phone via a pass-through connector of the mobile phone case that is directly connected to a docking port of the mobile phone.

8. The mobile phone case of claim 7, further comprising an embedded battery that provides autonomous power to the embedded electronics embedded in the mobile phone case.

9. The mobile phone case of claim 8, wherein the pass-through connector simultaneously recharges the autonomous battery embedded in the mobile phone case while the mobile phone is being charged.

10. The mobile phone case of claim 7, further comprising an embedded speaker that generates audible alerts when the mobile phone is unavailable.

11. The mobile phone case of claim 7, wherein the wireless interface is an ultra low-powered wireless interface.

12. The mobile phone case of claim 7, wherein the embedded controller includes a non-volatile memory for storage of user data.

13. A method providing a mobile phone case that interfaces communication between a glucose sensor and a mobile phone, the method comprising the steps of:
    receiving, at an embedded controller of the mobile phone case, a wireless signal comprising data from a glucose sensor;
    determining, by the controller, whether a mobile phone is available;
    transmitting the data received from the glucose sensor to the mobile phone if the mobile phone is available;
    displaying the data from the glucose sensor on a display of the mobile phone;
    transmitting the data received from the glucose sensor to an embedded speaker of the mobile phone case if the mobile phone is not available; and
    sounding an alert based on the data received from the glucose sensor.

14. The method of claim 13, wherein the data received from the glucose sensor is transmitted wirelessly from the controller to the mobile phone.

15. The method of claim 13, wherein the data received from the glucose sensor is transmitted from the controller to the mobile phone via a pass-through connector of the mobile phone case that is directly connected to a docking port of the mobile phone.

16. The method of claim 13, wherein if the controller determines that the mobile phone is not available, the controller will store a user's data in a non-volatile memory for retrieval when the mobile phone is once again available.

* * * * *